US011954531B2

(12) United States Patent
Schneider et al.

(10) Patent No.: US 11,954,531 B2
(45) Date of Patent: Apr. 9, 2024

(54) USE OF RELATIONAL DATABASES IN EPHEMERAL COMPUTING NODES

(71) Applicant: Optum, Inc., Minnetonka, MN (US)

(72) Inventors: William R. Schneider, University Park, MD (US); Momchil D. Georgiev, Bethesda, MD (US); Denise A. Rondeau, Waltham, MA (US); Ravisankar Subbaraj, Burlington, MA (US)

(73) Assignee: OPTUM, INC., Minnetonka, MN (US)

( * ) Notice: Subject to any disclaimer, the term of this patent is extended or adjusted under 35 U.S.C. 154(b) by 43 days.

(21) Appl. No.: 17/646,248

(22) Filed: Dec. 28, 2021

(65) Prior Publication Data
US 2023/0205588 A1   Jun. 29, 2023

(51) Int. Cl.
*G06F 9/50* (2006.01)
*G06F 16/21* (2019.01)
*G06F 16/22* (2019.01)
*G06F 16/2455* (2019.01)
*G06F 16/25* (2019.01)
*G06F 16/28* (2019.01)
*G06N 20/00* (2019.01)

(52) U.S. Cl.
CPC .......... *G06F 9/5027* (2013.01); *G06F 16/214* (2019.01); *G06F 16/2219* (2019.01); *G06F 16/24552* (2019.01); *G06F 16/256* (2019.01); *G06F 16/284* (2019.01); *G06N 20/00* (2019.01)

(58) Field of Classification Search
CPC ............. G06F 16/24552; G06F 16/284; G06F 16/214; G06F 16/256
See application file for complete search history.

(56) References Cited

U.S. PATENT DOCUMENTS

| 7,801,908 B2 | 9/2010 | Zachariah | |
| 8,307,003 B1* | 11/2012 | Sheth | G06F 16/958 707/790 |
| 8,612,396 B1* | 12/2013 | McAlister | G06F 11/1471 707/674 |
| 9,122,716 B1 | 9/2015 | Naganathan et al. | |

(Continued)

OTHER PUBLICATIONS

Giallorenzo, Saverio, et al. "Ephemeral data handling in microservices." 2019 IEEE International Conference on Services Computing (SCC). IEEE, 2019. (Year: 2019).*

(Continued)

*Primary Examiner* — William Spieler
(74) *Attorney, Agent, or Firm* — Shumaker & Sieffert, P.A (57) ABSTRACT

A method comprises: storing, by a computing system, a relational data in a data lake; spinning-up, by an orchestration system of the computing system, an ephemeral computing node on a computing device of the computing system; importing, by the ephemeral computing node, a copy of the relational data from the data lake into a relational database management system (RDBMS) installed on the ephemeral computing node; after importing the copy of the relational data into the RDBMS, performing, by the ephemeral computing node, a computing process that runs within the RDBMS and that uses the copy of the relational data; and after completion of the computing process on the ephemeral computing node, spinning-down, by the orchestration system, the ephemeral computing node.

20 Claims, 5 Drawing Sheets

(56) References Cited

U.S. PATENT DOCUMENTS

| | | |
|---|---|---|
| 10,346,374 B1 | 7/2019 | Johnson et al. |
| 10,719,492 B1 | 7/2020 | Edell |
| 10,909,120 B1 | 2/2021 | Mohamad et al. |
| 11,526,261 B1* | 12/2022 | Leach ............... G06F 9/451 |
| 2009/0063516 A1* | 3/2009 | Wang ............ H04L 41/0893 |
| 2010/0250499 A1* | 9/2010 | McAlister ......... G06F 11/1471 |
| | | 711/E12.001 |
| 2014/0059311 A1* | 2/2014 | Oberhofer ............ G06F 3/065 |
| | | 711/162 |
| 2015/0135084 A1* | 5/2015 | Rosenberger ...... G06Q 10/0637 |
| | | 715/738 |
| 2017/0011135 A1 | 1/2017 | Srivastava |
| 2017/0075965 A1* | 3/2017 | Liu .................. G06F 16/2386 |
| 2017/0270111 A1 | 9/2017 | Angelini et al. |
| 2018/0095952 A1* | 4/2018 | Rehal ................. G06F 16/27 |
| 2018/0096000 A1* | 4/2018 | Harrison ............ G06F 16/288 |
| 2018/0096001 A1* | 4/2018 | Soza .................. G06F 16/235 |
| 2019/0114251 A1* | 4/2019 | Sapozhnikov ........ H04L 43/55 |
| 2019/0243836 A1* | 8/2019 | Nanda ............. G06F 16/24568 |
| 2020/0004862 A1* | 1/2020 | Bauer ................ G06F 16/254 |
| 2020/0183897 A1* | 6/2020 | Laskawiec ........... G06F 16/214 |
| 2020/0210391 A1* | 7/2020 | Scott ................. G06F 16/254 |
| 2021/0117427 A1* | 4/2021 | Xiang ............. G06F 16/24532 |
| 2021/0160192 A1* | 5/2021 | Jain .................... H04L 47/80 |
| 2022/0046036 A1* | 2/2022 | Bastawala ........... G06F 11/3006 |
| 2022/0121982 A1* | 4/2022 | Rajagopalan ......... G06N 20/00 |

OTHER PUBLICATIONS

Verbitski, Alexandre, et al. "Amazon aurora: Design considerations for high throughput cloud-native relational databases." Proceedings of the 2017 ACM International Conference on Management of Data. 2017. (Year: 2017).*

Gholami et al., "Key challenges during legacy software system migration to cloud computing platforms—an empirical study", Information Systems, vol. 37, Apr. 1, 2017, pp. 100-113.

* cited by examiner

USE OF RELATIONAL DATABASES IN EPHEMERAL COMPUTING NODES

BACKGROUND

Enterprises often rely on relational databases, such as SQL databases, to store and retrieve data. For example, an enterprise may use relational databases to store business data, scientific data, or other types of data. Processing of queries to relational databases may consume a significant amount of computing resources.

SUMMARY

The present disclosure describes devices, systems, and methods for use of relational databases in ephemeral computing nodes. As described herein, a computing system stores relational data in a data lake. An orchestration system of the computing system may spin-up an ephemeral computing node on a computing device of the computing system. The ephemeral computing node may import a copy of the relational data from the data lake into the ephemeral computing node. After importing the copy of the relational data into the ephemeral computing node, the ephemeral computing node may perform a computing process that uses the copy of the relational data. After completion of the computing process on the ephemeral computing node, the orchestration system may spin-down the ephemeral computing node In one example, this disclosure describes a method comprising: storing, by a computing system, relational data in a data lake; spinning-up, by an orchestration system of the computing system, an ephemeral computing node on a computing device of the computing system; importing, by the ephemeral computing node, a copy of the relational data from the data lake into a relational database management system (RDBMS) installed on the ephemeral computing node; after importing the copy of the relational data into the RDBMS, performing, by the ephemeral computing node, a computing process that runs within the RDBMS and that uses the copy of the relational data; and after completion of the computing process on the ephemeral computing node, spinning-down, by the orchestration system, the ephemeral computing node.

In another example, this disclosure describes a computing system comprising: a storage system configured to store a data lake that contains relational data; and one or more processors implemented in circuitry and in communication with the storage system, the one or more processors configured to: spin up an ephemeral computing node on a computing device of the computing system; import a copy of the relational data from the data lake into a relational database management system (RDBMS) installed on the ephemeral computing node; after importing the copy of the relational data into the RDBMS, perform a computing process that runs within the RDBMS and that uses the copy of the relational data; and after completion of the computing process on the ephemeral computing node, spin down the ephemeral computing node.

In another example, this disclosure describes a non-transitory computer-readable storage medium having instructions stored thereon that, when executed, cause one or more processors of a computing system to: spin up an ephemeral computing node on a computing device of the computing system; import a copy of relational data from a data lake into a relational database management system (RDBMS) installed on the ephemeral computing node; after importing the copy of the relational data into the RDBMS, perform a computing process that runs within the RDBMS and that uses the copy of the relational data; and after completion of the computing process on the ephemeral computing node, spin down the ephemeral computing node.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Enterprises store and utilize large amounts of data. Such data is frequently stored as relational data in an RDBMS. Relational data may be tabular data interrelated with a predefined schema. Relational data, such as SQL data, typically are highly structured and include many different tables. A relational database management system (RDBMS) can potentially store data in a space-efficient manner. However, an RDBMS may not be suitable for applications that involve very large amounts of data or frequent additions to the data. Nevertheless, many enterprises have developed business processes around the use of relational data and specific RDBMS's. For example, an enterprise may have developed business logic (e.g., in the form of SQL queries or other types of relational data queries) that relies on relational data and executes in an RDBMS. Because so much business logic relies on an RDBMS, it may be difficult or costly to change relational data to other formats or to change between RDBMS's. Although this disclosure primarily discusses enterprises and business processes, the techniques of this disclosure are applicable to other types of individuals and organizations, such as government organizations, non-governmental organizations, non-profit organizations, and so on.

Many enterprises are now moving toward cloud-based computing systems to support business processes. Example public cloud-based computing systems include Amazon Web Services (AWS), Microsoft Azure, Google Cloud, and so on. Such cloud-based computing systems may enable an enterprise to use "big data" techniques for storing and utilizing data. For example, a cloud-based system may enable an enterprise to implement a data lake that stores data in a natural or raw format, such as BLOBs or files. Storing data in a data lake, as opposed to storing data in a relational database, may enable data to be stored much more quickly and may enable many more types of data to be stored and retrieved. Amazon S3 is an example service provided in AWS for storage of a data lake.

Cloud-based systems often utilize Platform as a Service (PaaS) techniques or Infrastructure as a Service (IaaS). This disclosure may use the terms PaaS and IaaS interchangeably. In a PaaS-based system, virtual machines may be "spun-up" and "spun-down" as needed. For example, a type of virtual machines known as an "ephemeral computing node" may be spun-up and down as needed to perform computing tasks, such as performing Extract-Transform-Load (ETL) processes, that utilize data in a data lake. The ephemeral computing nodes may also be referred to as "service wrappers." An advantage of such ephemeral computing nodes is that an enterprise may only need to pay a provider of the cloud-based system for such ephemeral computing nodes when the ephemeral computing nodes are actually in use. Another advantage of such ephemeral computing nodes is that the ephemeral computing nodes may enable "horizontal scaling." Horizontal scaling refers to the concept of using as many separate ephemeral computing nodes as needed, each accessing the same data lake, to run business processes quickly.

Another type of virtual machine provided in cloud-based computing systems is known as a "persistent computing node." A primary use of a persistent computing node is to perform the tasks of a relational database. For example, a persistent computing node may store a relational database and execute queries on the relational database. From the perspective of a user of a persistent computing node, the persistent computing node is a "black box" that provides information based on data stored in a relational database. Thus, a persistent computing node conceptually is something that persistently stores the returned data. In contrast, an ephemeral computing node does not conceptually store data because a developer knows that ephemeral computing nodes will be frequently spun-up and spun-down.

There may be several disadvantages associated with the use of persistent computing nodes. For example, persistent computing nodes are not spun-down when not in use, but rather may exist for prolonged periods of time. This is consistent to the concept of a persistent computing node as something that persistently stores data. Keeping a persistent computing node spun-up for prolonged periods of time may incur additional costs to an enterprise that uses the cloud-based system. In another example, persistent computing nodes typically do not enable horizontal scaling. In other words, there may only be a single persistent computing node for a relational database instead of multiple ephemeral computing nodes accessing the same database. Thus, increasing the performance of the persistent computing node may require provisioning additional processing cores or other computing resources, which may further increase costs to the enterprise. This is a considerable factor because most of the work of a persistent computing node applies to processing data and not to storage and simple retrieval of the data. In other words, very complex computational processes may occur when executing queries, such as determining statistical correlations and identifying trends, yet the persistent computing node is still conceptually treated like something for persistent storage of data.

This disclosure describes techniques that may address one or more of these problems. As described in this disclosure, ephemeral computing nodes may be used instead of persistent computing nodes to execute logic tied to a RDBMS. For example, relational data may be stored as a binary large object (BLOB) in a data lake. The data lake may also store other data of the enterprise and/or other enterprises. The cloud-based computing system may spin-up and spin-down ephemeral computing nodes as needed. For instance, the cloud-based computing system may spin-up an ephemeral computing node at the beginning of a database-backed computing process (e.g., a process that generates sales trend data from relational data that stores inventory). When spun-up, an ephemeral computing node imports the relational data from the data lake into a RDBMS installed on the ephemeral computing node. Thus, multiple ephemeral computing nodes may have imported separate full or partial copies of the relational data at the same time. This may enable horizontal scalability of access to the relational data. For instance, multiple ephemeral computing nodes may use different copies of the relational data for different database-backed computing processes. After the RDBMS has imported the relational data, the RDBMS may perform various database-backed computing processes, such as executing queries against the ephemeral computing node's copy of the relational data. When a database-backed computing process (i.e., a computing process performed by an RDBMS) is complete, an ephemeral computing node may export its copy of the relational data back to the data lake. The cloud-based computing system may then spin-down the ephemeral computing node. Spinning-down the ephemeral computing node when a database-backed computing process is complete may reduce the number of active ephemeral computing nodes associated with the enterprise, thereby potentially avoiding costs to the enterprise.

Figure 1:
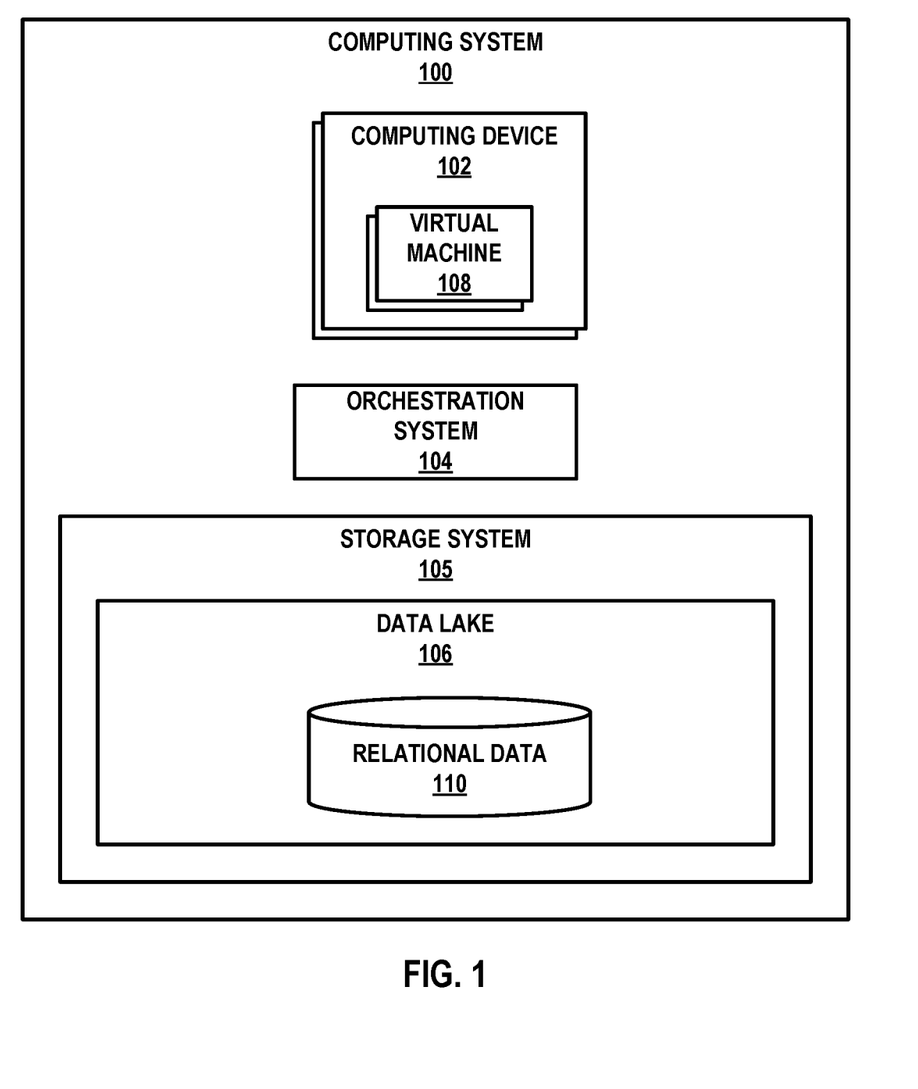
FIG. 1 is a block diagram illustrating an example system in accordance with one or more techniques of this disclosure.

FIG. 1 is a block diagram illustrating an example computing system 100 in accordance with one or more aspects of this disclosure. In the example of FIG. 1, computing system 100 includes a set of one or more computing devices 102, an orchestration system 104, and a storage system 105. Example types of computing devices include server devices, personal computers, mobile devices (e.g., smartphones, tablet computers, wearable devices), intermediate network devices, and so on. Computing devices 102 may host virtual machines 108. In some examples, one or more of computing devices 102 may host multiple virtual machines 108. Example types of virtual machines 108 may include ephemeral computing nodes and persistent computing nodes.

Orchestration system 104 may be implemented by one or more computing devices. Orchestration system 104 is configured to orchestrate the spin-up and spin-down of computing nodes, such as ephemeral computing nodes and persistent computing nodes. In some examples, orchestration system 104 may spin-up and spin-down computing nodes on behalf of an enterprise or other type of organization.

Storage system 105 may include one or more storage devices, such as hard disk drives, persistent memory units, and so on. Storage system 105 may be configured to store a data lake 106. Data lake 106 is a system or repository of data. Data stored in data lake 106 may be stored in the data's natural or raw format. For instance, data may be stored in data lake 106 as BLOBs or files. Data lake 106 may be implemented as cloud-based storage service, such as Amazon S3. In the example of FIG. 1, data lake 106 contains a relational data 110. Relational data 110 may store various types of data, such as business data, healthcare data, scientific data, and so on. The data in relational data 110 may belong to a specific enterprise or other organization.

In some examples, some or all of computing system 100 is implemented in a public cloud-based computing system, such as Amazon Web Services, Microsoft Azure, Google Cloud, and so on. In some examples where some or all of computing system 100 is implemented in a public cloud-based computing system, orchestration system 104 may be an event-driven computing platform, such as AWS Glue or AWS Lambda. In other examples, orchestration system 104 operates separately from the public cloud-based computing system. For instance, orchestration system 104 may operate on one or more private computing devices. In other examples, computing system 100 may be an entirely private system, such as a computing system run by an enterprise to perform computing tasks of the enterprise.

In accordance with one or more techniques of this disclosure, orchestration system 104 may spin up an ephemeral computing node on a computing device (e.g., one of computing devices 102) of computing system 100. Furthermore, the ephemeral computing node may import a copy of relational data 110 from data lake 106 into an RDBMS installed on the ephemeral computing node. Importing a copy of relational data 110 into the RDBMS may include storing the copy of relational data 110 at a location and in a manner so that the RDBMS may utilize the copy of the relational data 100. For example, the ephemeral computing node may command the RDBMS to copy the relational data into one or more specified tables that are managed by the RDBMS. After importing the copy of relational data 110 into the RDBMS, the RDBMS may perform a computing process that uses the copy of relational data 110. For example, the RDBMS may perform a statistical analysis process that uses data in the copy of relational data 110. When the RDBMS performs a computing process, the computing process is implemented in a way that depends on executing code within the RDBMS itself, e.g., by execution of SQL queries or stored procedures. Because this code may depend on a specific RDBMS implementation, large amounts of work may be involved in migrating the computing process to execute on a different database, or a system that uses a native big-data technology. After completion of the computing process on the ephemeral computing node, orchestration system 104 may spin down the ephemeral computing node. Because the copy of relational data 110 is imported into an RDBMS of the ephemeral computing node, instead of a persistent computing node, the ephemeral computing node may be spun-down when the computing process is complete. Spinning down the ephemeral computing node when the computing process is complete may free up processing cores and storage devices of computing devices 102 for other computing processes.

Figure 2:
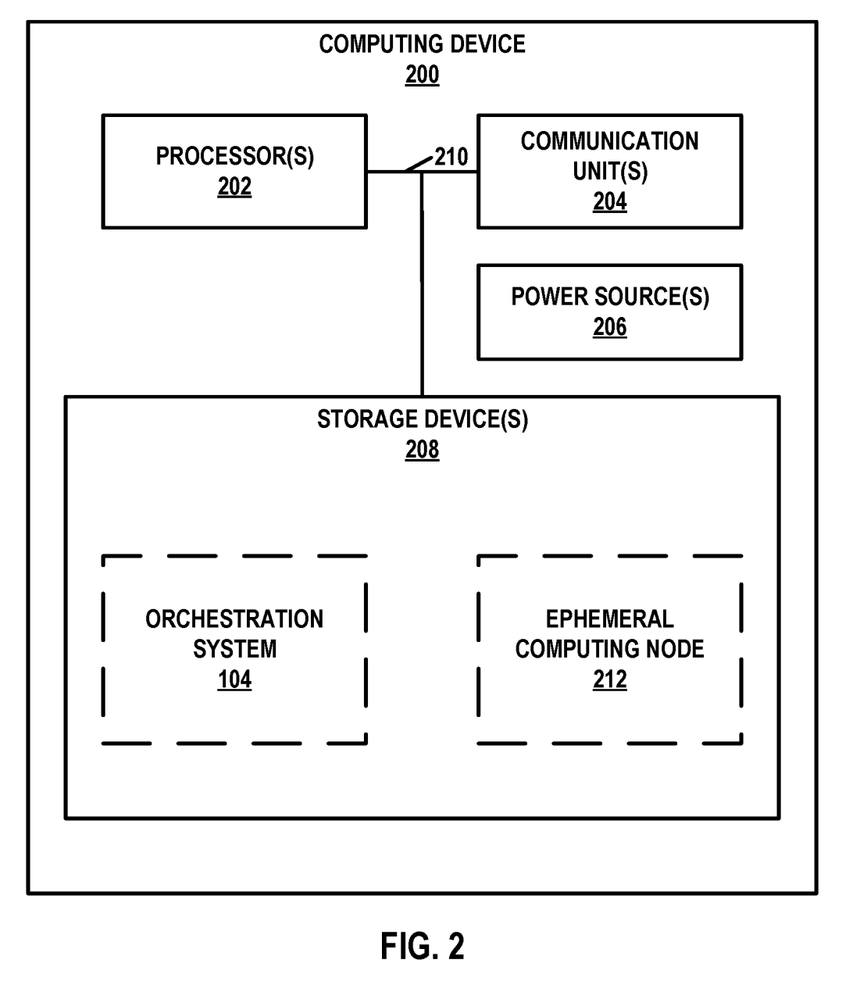
FIG. 2 is a block diagram illustrating example components of computing system in accordance with one or more aspects of this disclosure.

FIG. 2 is a block diagram illustrating example components of computing system 200 in accordance with one or more aspects of this disclosure. FIG. 2 illustrates only one example of computing system 200, without limitation on many other example configurations of computing system 200. Computing system 200 may be one of computing devices 102 or a computing device that implements orchestration system 104.

As shown in the example of FIG. 2, computing device 200 includes one or more processors 202, one or more communication units 204, one or more power sources 206, one or more storage devices 208, and one or more communication channels 210. Computing device 200 may include other components. For example, computing device 200 may include input devices, output devices, display screens, and so on. Communication channel(s) 210 may interconnect each of processor(s) 202, communication unit(s) 204, and storage device(s) 208 for inter-component communications (physically, communicatively, and/or operatively). In some examples, communication channel(s) 210 may include a system bus, a network connection, an inter-process communication data structure, or any other method for communicating data. Power source(s) 206 may provide electrical energy to processor(s) 202, communication unit(s) 204, storage device(s) 206 and communication channel(s) 210. Storage device(s) 208 may store information required for use during operation of computing device 200.

Processor(s) 202 comprise circuitry configured to perform processing functions. For instance, one or more of processor(s) 202 may be a microprocessor, an application-specific integrated circuit (ASIC), a field-programmable gate array (FPGA), or another type of processing circuitry. In some examples, processor(s) 202 of computing device 200 may read and execute instructions stored by storage device(s) 208. Processor(s) 202 may include fixed-function processors and/or programmable processors. Processor(s) 202 may be included in a single device or distributed among multiple devices.

Communication unit(s) 204 may enable computing device 200 to send data to and receive data from one or more other computing devices (e.g., via a communications network, such as a local area network or the Internet). In some examples, communication unit(s) 204 may include wireless transmitters and receivers that enable computing device 200 to communicate wirelessly with other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 200 may use communication unit(s) 204 to communicate with one or more other computing devices or systems, such as client device 104. Communication unit(s) 204 may be included in a single device or distributed among multiple devices.

Processor(s) 202 may read instructions from storage device(s) 208 and may execute instructions stored by storage device(s) 208. Execution of the instructions by processor(s) 202 may configure or cause computing device 200 to provide at least some of the functionality ascribed in this disclosure to computing device 200. Storage device(s) 208 may be included in a single device or distributed among multiple devices.

Storage device(s) 208 may include computer-readable instructions that are executable by processor(s) 202. For instance, in the example of FIG. 2, storage device(s) 208 may store computer-readable instructions that cause processor(s) 202 to provide the functionality of orchestration system 104 or that cause processor(s) 202 to provide the functionality of an ephemeral computing node 212. Example components of orchestration system 104 are provided with respect to FIG. 3. Example components of ephemeral computing node 212 are described with respect to FIG. 4.

Figure 3:
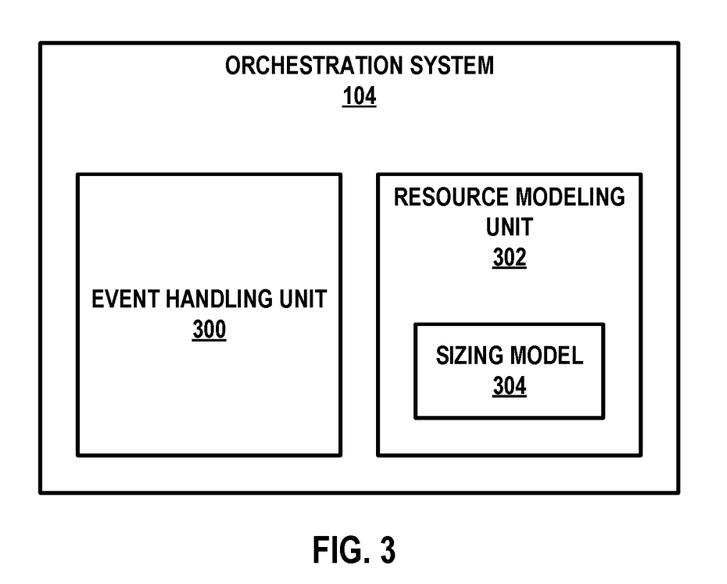
FIG. 3 is a block diagram illustrating example components of an orchestration system, in accordance with one or more techniques of this disclosure.

FIG. 3 is a block diagram illustrating example components of orchestration system 104, in accordance with one or more techniques of this disclosure. In some examples, orchestration system 104 comprises an event-driven, serverless computing platform. For example, orchestration system 104 may be an instance of an AWS Lambda platform.

In the example of FIG. 3, orchestration system 104 includes an event handling unit 300 and a resource modeling unit 302. Event handling unit 300 and resource modeling unit 302 may comprise software code that runs within the event-driven, serverless computing platform of orchestration system 104. Event handling unit 300 detect events and spins-up computing nodes in response to events. Events may include user requests to perform database-backed computing processes, specific times of day, sensor readings passing specific thresholds, and so on. For example, an enterprise may want a specific database-backed computing process to run once a day at 2:00 am. Accordingly, in this example, when event handling unit 300 determines that it is 2:00 am, event handling unit 300 may spin-up an ephemeral computing node to perform the database-backed computing process.

Thus, the process of spinning-up, spinning-down, importing, and exporting may all be performed in an automated event-driven manner by without extensive configuration by the enterprise. For example, in the context of AWS, the Amazon Glue platform may be used to manage this process without the enterprise needing to configure a Hadoop cluster. In this example, data lake 106 may include a catalog of logical tables. The logical tables may be associated with uniform resource locators (URLs). An Amazon Glue job may be configured to use a URL in the catalog to import relational data 110 from data lake 106 when an ephemeral computing node is spun-up and export the copy of relational data 110 back to data lake 106 when the ephemeral computing node is spun-down.

When event handling unit 300 spins-up an ephemeral computing node, event handling unit 300 may allocate computing resources to the ephemeral computing node. Example types of computing resources may include number of processing cores, types of processing cores, different amounts of RAM, and so on.

Event handling unit 300 may allocate different computing resources to different ephemeral computing nodes. In general, a cloud-based computing service provider associates higher monetary costs with an ephemeral computing node when the ephemeral computing node is allocated higher-performance computing resources. Thus, it may be advantageous to an enterprise to avoid using ephemeral computing nodes that are allocated more computing resources than needed.

The computing loads imposed on ephemeral computing nodes by different database-backed computing processes may be different. For example, a first database-backed computing process (i.e., a computing process performed by the RDBMS) may require an ephemeral computing node to perform a very complex process (and thus may have a high computing load) while a second database-backed computing process may require an ephemeral computing node to perform a simple process (and thus may have a low computing load). In another example, an enterprise may require a first database-backed computing process to be performed quicker than a second database-backed computing process. Accordingly, resource modeling unit 302 may determine computing resources to allocate to an ephemeral computing node prior to event handling unit 300 spinning-up of the ephemeral computing node. Avoiding unnecessary use of high numbers of processing cores may potentially avoid costs to the enterprise.

In some examples, resource modeling unit 302 may implement a sizing model 304 that suggests optimal sizes of ephemeral computing nodes for different database-backed computing processes. The size of an ephemeral computing node may refer to the number of processors allocated for use by the ephemeral computing node. Event handling unit 300 may then spin up ephemeral computing nodes that have the determined sizes. Thus, resource modeling unit 302 may determine resource parameters for a first computing process and spin-up a first ephemeral computing node such that the ephemeral computing node has the resource parameters determined for the first computing process. Resource parameters are parameters that characterize the computing resources of a computing node. The first ephemeral computing node may import a copy of relational data 110 from data lake 106 into the RDBMS installed on the ephemeral computing node. After importing the copy of relational data 110 into the RDBMS, the RDBMS may perform a first computing process that uses the copy of relational data 110. After completion of the first computing process on the ephemeral computing node, orchestration system 104 may spin down the first ephemeral computing node. Additionally, in this example, resource modeling unit 302 may determine resource parameters for a second computing process. The second computing process is different from the first computing process and the resource parameters determined for the second computing process may be different from the resource parameters determined for the first computing process. For instance, the resource parameters determined for the first computing process may include a different number of processing cores from the resource parameters determined for the second computing process. Event handling unit 300 may the spin-up a second ephemeral computing node such that the second ephemeral computing node has the resource parameters determined for the second computing process. The second ephemeral computing node may import a second copy of relational data 110 from data lake 106 into an RDBMS installed on the second ephemeral computing node. The RDBMS installed on the second ephemeral computing node may then perform the second computing process using the second copy of relational data 110. After completion of the second computing process on the second ephemeral computing node, orchestration system 104 may spin down the second ephemeral computing node.

In some examples, sizing model 304 comprises a machine learning (ML) or a regression model. Sizing model 304 may determine a resource parameters of an ephemeral computing node that is to perform a specific database-backed computing process based on the results of repeated performances of the database-backed computing process using different numbers of processing cores and data sets on other ephemeral computing nodes. Sizing model 304 may determine an optimal combination of cost, storage requirements, and/or time-to-completion for the computing process. In an example where sizing model 304 comprises an ML model, resource modeling unit 302 may apply the ML model to determine resource parameters for the database-backed computing process. Event handling unit 300 may spin up an ephemeral computing node such that the ephemeral computing node has the resource parameters determined for the database-backed computing process.

In some examples, resource modeling unit 302 may train the ML model based on resource utilization in previous performances of the database-backed computing process. For example, during a training phase, event handling unit 300 may spin-up ephemeral computing nodes with different computing resources and cause the ephemeral computing nodes to perform the database-backed computing process. In this example, when one of the ephemeral computing nodes performs the database-backed computing process, resource modeling unit 302 may collect training data. The training data may include information such as one or more of resource utilization data (e.g., the amount of time required to complete the database-backed computing process, processor utilization rates, and other information related to computing resources), speed of computation, monetary cost of performing the database-backed computing process on the ephemeral computing node, and so on. Furthermore, in this example, resource modeling unit 302 may apply a scoring function that generates a score value based on the training data. In one example, the scoring function may be a weighted sum of input values corresponding to the types of training data. The weights may be selected based on the priorities of an enterprise. In some examples, resource modeling unit 302 may perform a regression operation to determine a function that maps the computing resources of the ephemeral computing node to the score value generated by the scoring function based on training data collected when the database-backed computing process was performed on the ephemeral computing node. Resource modeling unit 302 may then determine a set of computing resources that maximizes the score value generated by the scoring function.

Figure 4:
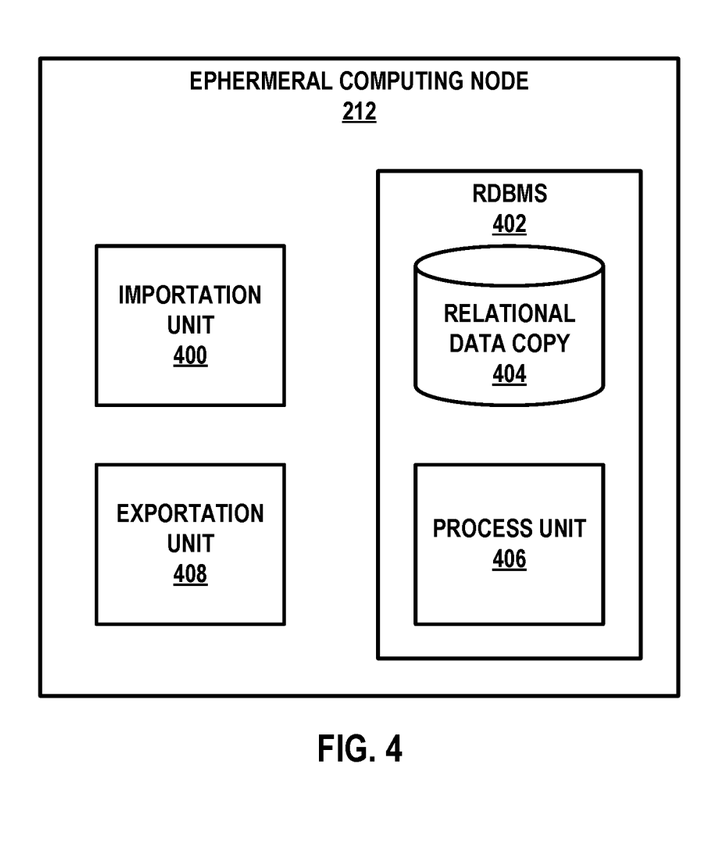
FIG. 4 is a block diagram illustrating example components of an ephemeral computing node, in accordance with one or more techniques of this disclosure.

FIG. 4 is a block diagram illustrating example components of ephemeral computing node 212, in accordance with one or more techniques of this disclosure. In the example of FIG. 4, ephemeral computing node 212 includes an importation unit 400, a RDBMS 402, a process unit 404, and an exportation unit 406. Importation unit 400 is configured to import relational data copy 404 from data lake 106 into RDBMS 402. Relational data copy 404 is a copy of some or all of relational data 110. For example, data lake 106 may include a catalog that includes URLs of items, e.g., BLOBs, files, etc. in data lake 106. Importation unit 400 may use a URL of relational data 110 to obtain relational data copy 404 from data lake 110. RDBMS 402 is a software system that define, create, maintain, and utilize a relational database. Example RDBMS 402 may include a SQL server, an Oracle database server, Microsoft Access, and so on.

Furthermore, process unit 406 of RDBMS 402 may perform a database-backed computing process that uses relational data copy 404. For example, process unit 406 may perform a statistical analysis of data in relational data copy 404. The database-backed computing process may read data from, write data to, delete data from, or perform other operations with respect to database copy 402.

Exportation unit 408 of ephemeral computing node 212 may export relational data copy 404 back to data lake 106. In some examples, exportation unit 408 only exports relational data copy 404 back to data lake 106 if process unit 408 made changes to relational data copy 404. Furthermore, in some examples, if changes were made to relational data 110 in data lake 106 during a time between when relational data copy 404 was created and when exportation unit 408 exports relational data copy 404 back to data lake 106, exportation unit 206 may perform an operation to reconcile changes in relational data copy 404 with the changes made to relational data 110.

Figure 5:
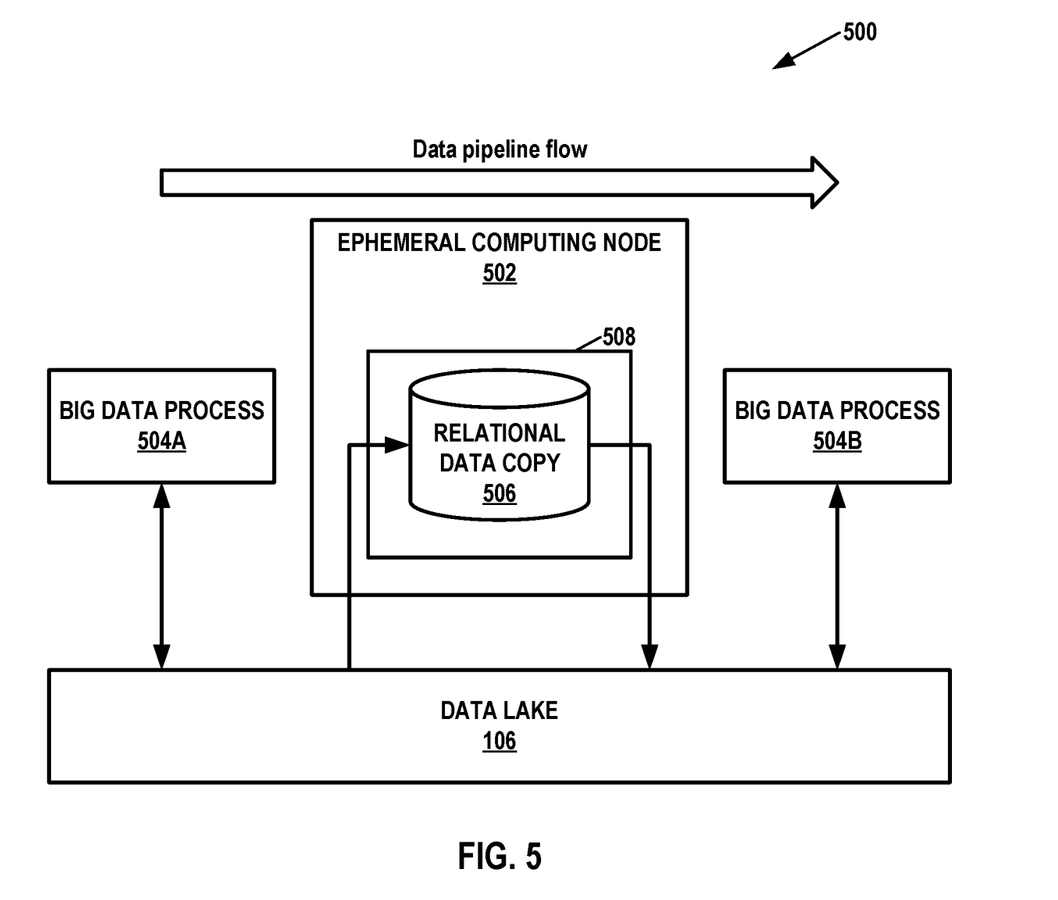
FIG. 5 is a conceptual diagram illustrating an example data pipeline flow in accordance with one or more techniques of this disclosure.

FIG. 5 is a conceptual diagram illustrating an example data pipeline flow in accordance with one or more techniques of this disclosure. In the example of FIG. 5, orchestration system 104 may use an ephemeral computing node 502 as part of a data pipeline 500. Data pipeline 500 comprises a series of steps perform by different ephemeral computing nodes on data in data lake 106. In the example of FIG. 5, data pipeline includes big data processes 504A, 504B (collectively, "big data processes 504"). Big data processes 504 may be conventional ephemeral computing nodes that use BLOBs, files, or other types of big data-style data from data lake 106. As is typical of big data processes, orchestration system 104 may spin up and spin down big data processes 504 as needed to perform steps of data pipeline 500.

In accordance with one or more techniques of this disclosure, orchestration system 104 may spin up and spin down ephemeral computing node 502 in the same way as big data processes 504. For instance, orchestration system 104 may spin up big data process 504A first, spin down big data process 504A, then spin up ephemeral computing node 502, spin down ephemeral computing node 502, spin up big data process 504B, spin down big data process 504B, and so on. However, when orchestration system 104 spins up ephemeral computing node 502, a relational data copy 506 is imported into an RDBMS 508 installed on ephemeral computing node 502.

Figure 6:
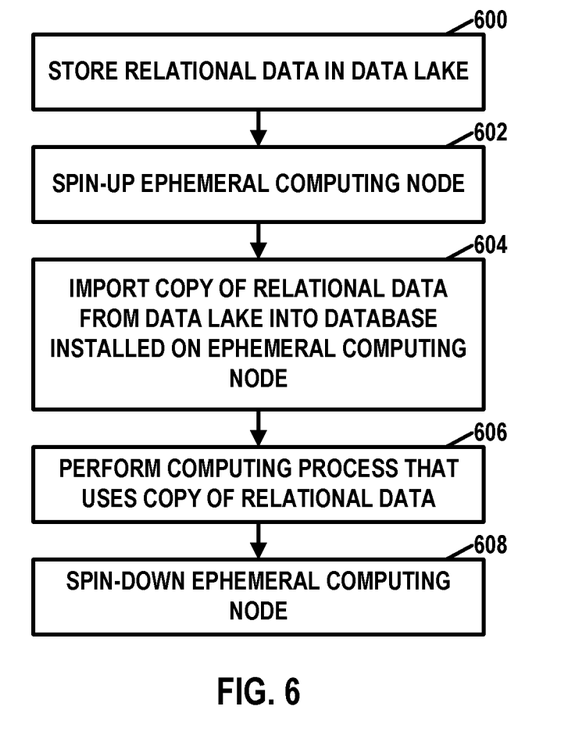
FIG. 6 is a flowchart illustrating an example operation in accordance with one or more techniques of this disclosure.

FIG. 6 is a flowchart illustrating an example operation in accordance with one or more techniques of this disclosure. The operation of FIG. 6 is presented as an example. Other operations in accordance with one or more techniques of this disclosure may include, more, fewer, or different actions.

In the example of FIG. 6, computing system 100 may store relational data 110 in data lake 106 (600). In some examples, computing system 100 may store relational data 110 in data lake 106 as a BLOB. Additionally, orchestration system 104 of computing system 100 may spin up an ephemeral computing node (e.g., ephemeral computing node 212) on a computing device (e.g., one of computing devices 102) of computing system 100 (602). The ephemeral computing node may import a copy of relational data 110 from data lake 106 into an RDBMS (e.g., RDBMS 402 or RDBMS 508) installed on the ephemeral computing node (604). In some examples, the ephemeral computing node may import a portion of relational data 110 (e.g., a subset of tables of relational data 110). In such examples, the same or different portion of relational data 110 may have been imported concurrently into one or more other ephemeral computing nodes. In some examples, the RDBMS is installed on the ephemeral computing node as part of spinning up the ephemeral computing node. In some examples, a software process installs the RDBMS on the ephemeral computing node after the ephemeral computing node has been spun up.

After importing the copy of relational data 110 into the RDBMS, the RDBMS may perform a computing process that uses the copy of relational data 110 (606). For example, the RDBMS may execute one or more queries against the copy of relational data 110. As part of executing the queries against the copy of relational data 110, the RDBMS may read data from the copy of relational data 110, modify data in the copy of relational data 110, delete data from the copy of relational data 110, add data to the copy of relational data 110, or perform one or more other actions. RDBMS's installed on different ephemeral computing nodes may perform different computing processes on relational data 110.

After completion of the computing process on the ephemeral computing node, orchestration system 104 may spin down the ephemeral computing node (608). In some examples where the computing process updates the copy of the relational data 110, prior to spinning-down the ephemeral computing node, computing system 100 may export the copy of relational data 110 to data lake 106.

Computing system 100 may perform the process of FIG. 6 repeatedly, using the same relational data 110 in ephemeral computing nodes that perform the same or different computing processes. This stands in contrast to a persistent computing node in which an RDBMS and the relational data 110 is maintained and the persistent computing node performed multiple computing processes using the relational data 110 without being spun down. As discussed elsewhere in this disclosure, maintaining the persistent computing node may be reduce resource availability within computing system 100.

Moreover, computing system 100 may perform multiple instances of the process of FIG. 6 at least partially concurrently, thereby enabling horizontal scaling. For example, the ephemeral computing node mentioned above may be a first ephemeral computing node, the copy of the relational data is a first copy of the relational data, and the computing process is a first computing process. In this example, orchestration system 104 may spin-up a second ephemeral computing node. After the first copy of the relational data is imported into an RDBMS installed on the first ephemeral computing node and prior to spinning-down the first ephemeral computing node, the second ephemeral computing node may import a second copy of relational data 110 from data lake 106 into an RDBMS installed on the second ephemeral computing node. After importing the second copy of the relational data into the RDBMS installed on the second ephemeral computing node, the RDBMS installed on the second ephemeral computing node may perform a second computing process that uses the second copy of the relational data. After completion of the second computing process on the second ephemeral computing node, orchestration system 104 may spin-down the second ephemeral computing node.

The following is a non-limiting list of examples that are in accordance with one or more techniques of this disclosure.

EXAMPLE 1

A method includes storing, by a computing system, a relational data in a data lake; spinning-up, by an orchestration system of the computing system, an ephemeral computing node on a computing device of the computing system; importing, by the ephemeral computing node, a copy of the relational data from the data lake into a relational database management system (RDBMS) installed on the ephemeral computing node; after importing the copy of the relational data into the RDBMS, performing, by the ephemeral computing node, a computing process that runs within the RDBMS and that uses the copy of the relational data; and after completion of the computing process on the ephemeral computing node, spinning-down, by the orchestration system, the ephemeral computing node.

EXAMPLE 2

The method of example 1, wherein: the ephemeral computing node is a first ephemeral computing node, the RDBMS is a first RDBMS, the copy of the relational data is a first copy of the relational data, and the method further comprises: spinning-up, by the orchestration system, a second ephemeral computing node; after the first copy of the relational data is imported into the first RDBMS installed on the first ephemeral computing node and prior to spinning-down the first ephemeral computing node, importing, by the second ephemeral computing node, a second copy of the relational data from the data lake into a second RDBMS installed on the second ephemeral computing node; after importing the second copy of the relational data into the second RDBMS, performing, by the second ephemeral computing node, a second computing process that runs within the second RDBMS and that uses the second copy of the relational data; and after completion of the second computing process on the second ephemeral computing node, spinning-down, by the orchestration system, the second ephemeral computing node.

EXAMPLE 3

The method of any of examples 1 and 2, wherein the computing process updates the copy of the relational data, and the method further comprises, prior to spinning-down the ephemeral computing node, exporting, by the computing system, the updated copy of the relational data to the data lake.

EXAMPLE 4

The method of any of examples 1 through 3, wherein storing the relational data in the data lake comprises storing the relational data in the data lake as a binary large object (BLOB).

EXAMPLE 5

The method of any of examples 1 through 4, wherein: the ephemeral computing node is a first ephemeral computing node, the copy of the relational data is a first copy of the relational data, the computing process is a first computing process, and the method further comprises determining, by the orchestration system, resource parameters for the first computing process, spinning-up the first ephemeral computing node comprises spinning-up, by the orchestration system, the first ephemeral computing node such that the first ephemeral computing node has the resource parameters determined for the first computing process, the method further comprises: determining, by the orchestration system, resource parameters for a second computing process, wherein the second computing process is different from the first computing process and the resource parameters determined for the second computing process are different from the resource parameters determined for the first computing process; spinning-up, by the orchestration system, a second ephemeral computing node such that the second ephemeral computing node has the resource parameters determined for the second computing process; importing, by the second ephemeral computing node, a second copy of the relational data from the data lake into an RDBMS installed on the second ephemeral computing node; performing, by the RDBMS installed on the second ephemeral computing node, the second computing process, wherein the second computing process uses the second copy of the relational data; and after completion of the second computing process on the second ephemeral computing node, spinning-down, by the orchestration system, the second ephemeral computing node.

EXAMPLE 6

The method of example 5, wherein the resource parameters determined for the first computing process include a different number of processing cores from the resource parameters determined for the second computing process.

EXAMPLE 7

The method of any of examples 1 through 6, wherein: the method further comprises applying, by the orchestration system, a machine learning (ML) model to determine resource parameters for the computing process, and spinning-up the ephemeral computing node comprises spinning-up, by the orchestration system, the ephemeral computing node such that the ephemeral computing node has the resource parameters determined for the computing process.

EXAMPLE 8

The method of example 7, further comprising training, by the computing system, the ML model based on resource utilization in previous performances of the computing process.

EXAMPLE 9

A computing system includes a storage system configured to store a data lake that contains a relational data; and one or more processors implemented in circuitry and in communication with the storage system, the one or more processors configured to: spin up an ephemeral computing node on a computing device of the computing system; import a copy of the relational data from the data lake into a relational database management system (RDBMS) installed on the ephemeral computing node; after importing the copy of the relational data into the RDBMS, perform a computing process that runs within the RDBMS and that uses the copy of the relational data; and after completion of the computing process on the ephemeral computing node, spin down the ephemeral computing node.

EXAMPLE 10

The computing system of example 9, wherein: the ephemeral computing node is a first ephemeral computing node, the RDBMS is a first RDBMS, the copy of the relational data is a first copy of the relational data, and the one or more processors are further configured to: spin-up a second ephemeral computing node; after the first copy of the relational data is imported into the first RDBMS installed on the first ephemeral computing node and prior to spinning-down the first ephemeral computing node, import a second copy of the relational data from the data lake into a second RDBMS installed on the second ephemeral computing node; after importing the second copy of the relational data into the second RDBMS, perform, by the second RDBMS, a second computing process that runs within the second RDBMS and that uses the second copy of the relational data; and after completion of the second computing process on the second ephemeral computing node, spin down the second ephemeral computing node.

EXAMPLE 11

The computing system of any of examples 9 and 10, wherein the computing process updates the copy of the relational data, and the one or more processors are further configured to, prior to spinning-down the ephemeral computing node, export the updated copy of the relational data to the data lake.

EXAMPLE 12

The computing system of any of examples 9 through 11, wherein the relational data is stored in the data lake as a binary large object (BLOB).

EXAMPLE 13

The computing system of any of examples 9 through 12, wherein: the ephemeral computing node is a first ephemeral computing node, the copy of the relational data is a first copy of the relational data, the computing process is a first computing process, and the one or more processors are further configured to determine resource parameters for the first computing process, the one or more processors are configured to spin up the first ephemeral computing node such that the first ephemeral computing node has the resource parameters determined for the first computing process, the one or more processors are further configured to: determine resource parameters for a second computing process, wherein the second computing process is different from the first computing process and the resource parameters determined for the second computing process are different from the resource parameters determined for the first computing process; spin up a second ephemeral computing node such that the second ephemeral computing node has the resource parameters determined for the second computing process; import a second copy of the relational data from the data lake into an RDBMS installed on the second ephemeral computing node; perform the second computing process within the RDBMS installed on the second ephemeral computing node, wherein the second computing process uses the second copy of the relational data; and after completion of the second computing process on the second ephemeral computing node, spin down the second ephemeral computing node.

EXAMPLE 14

The computing system of example 13, wherein the resource parameters determined for the first computing process include a different number of processing cores from the resource parameters determined for the second computing process.

EXAMPLE 15

The computing system of any of examples 9 through 14, wherein: the one or more processors are further configured to apply a machine learning (ML) model to determine resource parameters for the computing process, and the one or more processors are configured to spin up the ephemeral computing node such that the ephemeral computing node has the resource parameters determined for the computing process.

EXAMPLE 16

The computing system of example 15, wherein the one or more processors are configured to train the ML model based on resource utilization in previous performances of the computing process.

EXAMPLE 17

A non-transitory computer-readable storage medium having instructions stored thereon that, when executed, cause one or more processors of a computing system to: spin up an ephemeral computing node on a computing device of the computing system; import a copy of a relational data from a data lake into a relational database management system (RDBMS) installed on the ephemeral computing node; after importing the copy of the relational data into the RDBMS, perform a computing process that runs within the RDBMS and that uses the copy of the relational data; and after completion of the computing process on the ephemeral computing node, spin down the ephemeral computing node.

EXAMPLE 18

The non-transitory computer-readable storage medium of example 17, wherein: the ephemeral computing node is a first ephemeral computing node, the copy of the relational data is a first copy of the relational data, and the instructions, when executed, further cause the one or more processors to: spin-up a second ephemeral computing node; after the first copy of the relational data is imported into the first ephemeral computing node and prior to spinning-down the first ephemeral computing node, import, by the second ephemeral computing node, a second copy of the relational data from the data lake into the second ephemeral computing node; after importing the second copy of the relational data into the second ephemeral computing node, perform, by the second ephemeral computing node, a second computing process that uses the second copy of the relational data; and after completion of the second computing process on the second ephemeral computing node, spin-down the second ephemeral computing node.

EXAMPLE 19

The non-transitory computer-readable storage medium of any of examples 17 and 18, wherein: the ephemeral computing node is a first ephemeral computing node, the copy of the relational data is a first copy of the relational data, the computing process is a first computing process, and the instructions, when executed, further cause the one or more processors to determine resource parameters for the first computing process, the instructions that cause the one or more processors to spin-up the first ephemeral computing node comprise instructions that, when executed, cause the one or more processors to spin-up the first ephemeral computing node such that the ephemeral computing node has the resource parameters determined for the first computing process, the instructions, when executed, further cause the one or more processors to: determine resource parameters for a second computing process, wherein the second computing process is different from the first computing process and the resource parameters determined for the second computing process are different from the resource parameters determined for the first computing process; spin up a second ephemeral computing node such that the second ephemeral computing node has the resource parameters determined for the second computing process; import, by the second ephemeral computing node, a second copy of the relational data from the data lake into the second ephemeral computing node; perform, by the second ephemeral computing node, the second computing process, wherein the second computing process uses the second copy of the relational data; and after completion of the second computing process on the second ephemeral computing node, spin down the second ephemeral computing node.

EXAMPLE 20

The non-transitory computer-readable storage medium of any of examples 17 through 19, wherein: the instructions, when executed, further cause the one or more processors to apply a machine learning (ML) model to determine resource parameters for the computing process, and the instructions that cause the one or more processors to spin up the ephemeral computing node comprise instructions that, when executed, cause the one or more processors to spin-up the ephemeral computing node such that the ephemeral computing node has the resource parameters determined for the computing process.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

What is claimed is:

1. A method comprising:
    spinning-up, by a computing system, on a computing device of the computing system, an ephemeral computing node configured to:
        import, into a relational database management system (RDBMS) installed on the ephemeral computing node, a copy of relational data that is stored in a data lake; and
        perform a computing process that runs within the RDBMS and that uses the copy of the relational data; and
    after completion of the computing process on the ephemeral computing node, spinning-down, by the computing system, the ephemeral computing node.

2. The method of claim 1, wherein:
    the ephemeral computing node is a first ephemeral computing node,
    the RDBMS is a first RDBMS,
    the copy of the relational data is a first copy of the relational data, and
    the method further comprises:
        spinning-up, by the computing system, a second ephemeral computing node that is configured to:
            after the first copy of the relational data is imported into the first RDBMS installed on the first ephemeral computing node and prior to spinning-down the first ephemeral computing node, import a second copy of the relational data from the data lake into a second RDBMS installed on the second ephemeral computing node; and
            perform a second computing process that runs within the second RDBMS and that uses the second copy of the relational data; and
        after completion of the second computing process on the second ephemeral computing node, spinning-down, by the computing system, the second ephemeral computing node.

3. The method of claim 1,
    wherein the computing process updates the copy of the relational data, and
    the method further comprises, prior to spinning-down the ephemeral computing node, exporting, by the computing system, the updated copy of the relational data to the data lake.

4. The method of claim 1, the relational data is stored in the data lake as a binary large object (BLOB).

5. The method of claim 1, wherein:
    the ephemeral computing node is a first ephemeral computing node,
    the copy of the relational data is a first copy of the relational data,
    the computing process is a first computing process, and
    the method further comprises determining, by the computing system, resource parameters for the first computing process,
    spinning-up the first ephemeral computing node comprises spinning-up, by the computing system, the first ephemeral computing node such that the first ephemeral computing node has the resource parameters determined for the first computing process,
    the method further comprises:
        determining, by the computing system, resource parameters for a second computing process, wherein the second computing process is different from the first computing process and the resource parameters determined for the second computing process are different from the resource parameters determined for the first computing process;
        spinning-up, by the computing system, a second ephemeral computing node such that the second ephemeral computing node has the resource parameters determined for the second computing process and such that the second ephemeral computing node is configured to:
            import a second copy of the relational data from the data lake into an RDBMS installed on the second ephemeral computing node; and
            perform, by the RDBMS installed on the second ephemeral computing node, the second computing process, wherein the second computing process uses the second copy of the relational data; and
        after completion of the second computing process on the second ephemeral computing node, spinning-down, by the computing system, the second ephemeral computing node.

6. The method of claim 5, wherein the resource parameters determined for the first computing process include a different number of processing cores from the resource parameters determined for the second computing process.

7. The method of claim 1, wherein:
    the method further comprises applying, by the computing system, a machine learning (ML) model to determine resource parameters for the computing process, and
    spinning-up the ephemeral computing node comprises spinning-up, by the computing system, the ephemeral computing node such that the ephemeral computing node has the resource parameters determined for the computing process.

8. The method of claim 7, further comprising training, by the computing system, the ML model based on resource utilization in previous performances of the computing process.

9. A computing system comprising:
one or more processors implemented in circuitry and in communication with a storage system, the one or more processors configured to:
spin up, on a computing device of the computing system, an ephemeral computing node configured to:
import, into a relational database management system (RDBMS) installed on the ephemeral computing node, a copy of relational data that is stored in a data lake;
perform a computing process that runs within the RDBMS and that uses the copy of the relational data; and
after completion of the computing process on the ephemeral computing node, spin down the ephemeral computing node.

10. The computing system of claim 9, wherein:
the ephemeral computing node is a first ephemeral computing node,
the RDBMS is a first RDBMS,
the copy of the relational data is a first copy of the relational data, and
the one or more processors are further configured to:
spin-up a second ephemeral computing node that is configured to:
after the first copy of the relational data is imported into the first RDBMS installed on the first ephemeral computing node and prior to spinning-down the first ephemeral computing node, import a second copy of the relational data from the data lake into a second RDBMS installed on the second ephemeral computing node; and
perform a second computing process that runs within the second RDBMS and that uses the second copy of the relational data; and
after completion of the second computing process on the second ephemeral computing node, spin down the second ephemeral computing node.

11. The computing system of claim 9,
wherein the computing process updates the copy of the relational data, and
the one or more processors are further configured to, prior to spinning-down the ephemeral computing node, export the updated copy of the relational data to the data lake.

12. The computing system of claim 9, wherein the relational data is stored in the data lake as a binary large object (BLOB).

13. The computing system of claim 9, wherein:
the ephemeral computing node is a first ephemeral computing node,
the copy of the relational data is a first copy of the relational data,
the computing process is a first computing process, and
the one or more processors are further configured to determine resource parameters for the first computing process,
the one or more processors are configured to spin up the first ephemeral computing node such that the first ephemeral computing node has the resource parameters determined for the first computing process,
the one or more processors are further configured to:
determine resource parameters for a second computing process, wherein the second computing process is different from the first computing process and the resource parameters determined for the second computing process are different from the resource parameters determined for the first computing process;
spin up a second ephemeral computing node such that the second ephemeral computing node has the resource parameters determined for the second computing process and such that the second ephemeral computing node is configured to:
import a second copy of the relational data from the data lake into an RDBMS installed on the second ephemeral computing node; and
perform the second computing process within the RDBMS installed on the second ephemeral computing node, wherein the second computing process uses the second copy of the relational data; and
after completion of the second computing process on the second ephemeral computing node, spin down the second ephemeral computing node.

14. The computing system of claim 13, wherein the resource parameters determined for the first computing process include a different number of processing cores from the resource parameters determined for the second computing process.

15. The computing system of claim 9, wherein:
the one or more processors are further configured to apply a machine learning (ML) model to determine resource parameters for the computing process, and
the one or more processors are configured to spin up the ephemeral computing node such that the ephemeral computing node has the resource parameters determined for the computing process.

16. The computing system of claim 15, wherein the one or more processors are configured to train the ML model based on resource utilization in previous performances of the computing process.

17. A non-transitory computer-readable storage medium having instructions stored thereon that, when executed, cause one or more processors of a computing system to:
spin up, on a computing device of the computing system, an ephemeral computing node configured to:
import, into a relational database management system (RDBMS) installed on the ephemeral computing node, a copy of relational data that is stored in a data lake; and
perform a computing process that runs within the RDBMS and that uses the copy of the relational data; and
after completion of the computing process on the ephemeral computing node, spin down the ephemeral computing node.

18. The non-transitory computer-readable storage medium of claim 17, wherein:
the ephemeral computing node is a first ephemeral computing node,
the copy of the relational data is a first copy of the relational data, and
the instructions, when executed, further cause the one or more processors to:
spin-up a second ephemeral computing node that is configured to:

after the first copy of the relational data is imported into the first ephemeral computing node and prior to spinning-down the first ephemeral computing node, import a second copy of the relational data from the data lake into the second ephemeral computing node; and after importing the second copy of the relational data into the second ephemeral computing node, perform a second computing process that uses the second copy of the relational data; and after completion of the second computing process on the second ephemeral computing node, spin-down the second ephemeral computing node.

19. The non-transitory computer-readable storage medium of claim 17, wherein:

the ephemeral computing node is a first ephemeral computing node, the copy of the relational data is a first copy of the relational data, the computing process is a first computing process, and the instructions, when executed, further cause the one or more processors to determine resource parameters for the first computing process, the instructions that cause the one or more processors to spin-up the first ephemeral computing node comprise instructions that, when executed, cause the one or more processors to spin-up the first ephemeral computing node such that the ephemeral computing node has the resource parameters determined for the first computing process, and the instructions, when executed, further cause the one or more processors to:

determine resource parameters for a second computing process, wherein the second computing process is different from the first computing process and the resource parameters determined for the second computing process are different from the resource parameters determined for the first computing process;

spin up a second ephemeral computing node such that the second ephemeral computing node has the resource parameters determined for the second computing process and such that the second ephemeral computing node is configured to:

import a second copy of the relational data from the data lake into the second ephemeral computing node; and perform the second computing process, wherein the second computing process uses the second copy of the relational data; and after completion of the second computing process on the second ephemeral computing node, spin down the second ephemeral computing node.

20. The non-transitory computer-readable storage medium of claim 17, wherein:

the instructions, when executed, further cause the one or more processors to apply a machine learning (ML) model to determine resource parameters for the computing process, and the instructions that cause the one or more processors to spin up the ephemeral computing node comprise instructions that, when executed, cause the one or more processors to spin-up the ephemeral computing node such that the ephemeral computing node has the resource parameters determined for the computing process.

* * * * *